(12) United States Patent
Ma et al.

(10) Patent No.: US 10,948,805 B2
(45) Date of Patent: Mar. 16, 2021

(54) CAMERA MODULE

(71) Applicants: TRIPLE WIN TECHNOLOGY(SHENZHEN) CO. LTD., Shenzhen (CN); HON HAI PRECISION INDUSTRY CO., LTD., New Taipei (TW)

(72) Inventors: Xiao-Mei Ma, Guangdong (CN); Shin-Wen Chen, New Taipei (TW); Long-Fei Zhang, Guangdong (CN); Kun Li, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 329 days.

(21) Appl. No.: 16/121,809

(22) Filed: Sep. 5, 2018

(65) Prior Publication Data
US 2020/0004111 A1 Jan. 2, 2020

(30) Foreign Application Priority Data

Jun. 28, 2018 (CN) .......................... 201810686116.3

(51) Int. Cl.
G03B 17/12 (2021.01)
G02B 7/02 (2021.01)

(52) U.S. Cl.
CPC ............. *G03B 17/12* (2013.01); *G02B 7/022* (2013.01)

(58) Field of Classification Search
CPC ................................ G03B 17/12; G03B 7/022
See application file for complete search history.

(56) References Cited

U.S. PATENT DOCUMENTS

| 2008/0131131 A1* | 6/2008 | Chen ...................... G08C 17/02 398/106 |
| 2011/0262121 A1* | 10/2011 | Yanagisawa ........... G03B 17/02 396/55 |
| 2012/0230664 A1* | 9/2012 | Pavithran ................. G03B 3/10 396/89 |
| 2014/0042648 A1* | 2/2014 | Wang ..................... G02B 7/025 264/1.36 |

(Continued)

FOREIGN PATENT DOCUMENTS

| CN | 205029745 | 2/2016 |
| CN | 105704354 A | 6/2016 |

(Continued)

*Primary Examiner* — Clayton E. LaBalle
*Assistant Examiner* — Dennis Hancock
(74) *Attorney, Agent, or Firm* — ScienBiziP, P.C.

(57) ABSTRACT

A camera module which is sealed and given protection against damage from forcible impacts includes a lens module, a lens tube, and a protecting cover. The lens module has lens screw threads on its outer wall. The lens tube includes a lens receiving space, the lens module is received in the lens receiving space, lens tube screw threads are formed on an inner wall of the lens receiving space. The lens tube screw threads match the lens screw threads. The protecting cover includes a cushioning portion and a dustproofing portion. The cushioning portion and the dustproofing portion are attached to and cover the outer exposed surfaces of the lens tube. The dustproofing portion covers the lens thread and the lens tube screw threads.

14 Claims, 3 Drawing Sheets

(56) References Cited

U.S. PATENT DOCUMENTS

| | | | | |
|---|---|---|---|---|
| 2014/0151118 A1* | 6/2014 | Han | ..................... | H05K 3/3405 |
| | | | | 174/88 R |
| 2016/0097912 A1* | 4/2016 | Kobori | ................. | H04N 5/2254 |
| | | | | 359/820 |
| 2016/0205295 A1* | 7/2016 | Yamamoto | ............. | H04N 5/225 |
| | | | | 29/407.04 |
| 2018/0217348 A1* | 8/2018 | Han | ....................... | H04N 5/232 |

FOREIGN PATENT DOCUMENTS

| | | |
|---|---|---|
| CN | 106506914 | 3/2017 |
| TW | I507755 B | 11/2015 |

\* cited by examiner

CAMERA MODULE

FIELD

The subject matter of the application generally relates to a camera module.

BACKGROUND

As cameras are more frequently used, consumers are expecting reliability and quality to improve.

Most camera modules have a lens, a lens tube, a motor, a filter, a sensor chip, a plastic base, and a circuit board. When a sharp impact force is applied to the camera, such as by dropping the camera, the focusing motor can short-circuit, open up, or separate from other internal parts. The glue between the lens holder and the mirror holder is not made to resist such impact forces and can break up and form fragments or particles that obstruct the lens. This results in decreased imaging quality of the camera module.

If the lens tube and the lens are connected by a screw thread, a small gap may be present, allowing dust and the like to enter the camera module through the gap. This also results in decreased imaging quality of the camera module.

Thus, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
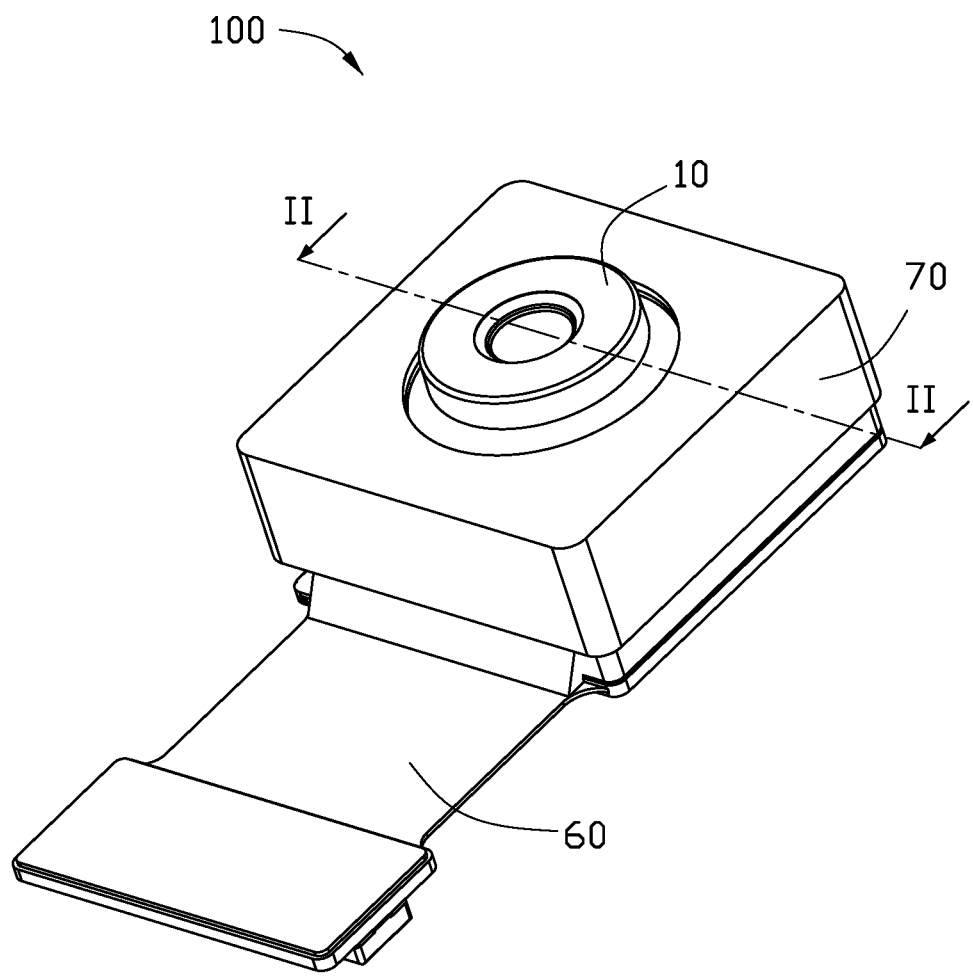
FIG. 1 is a perspective view of an embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
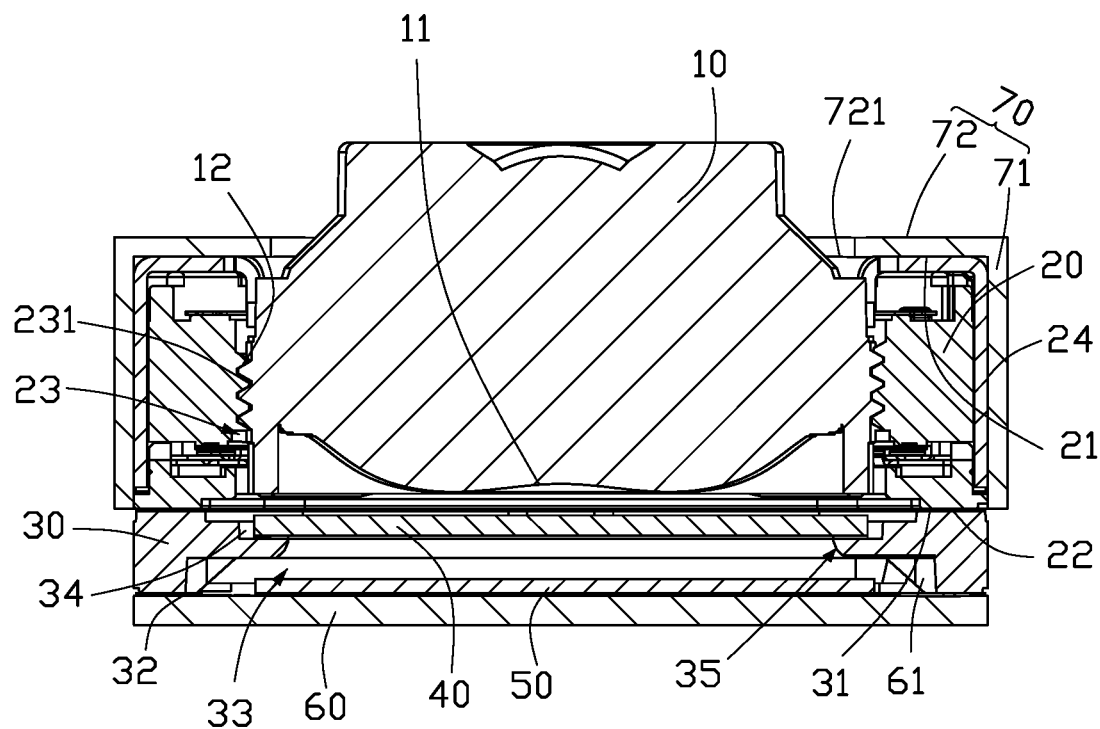
FIG. 2 is a cross-sectional view of the camera module of FIG. 1 along line II-II.

FIGS. 1-2 show a camera module 100. The camera module 100 includes a lens module 10, a lens tube 20, a base 30, an optical filter 40, a sensor 50, a printed circuit board 60, and a protecting cover 70.

The lens module 10 is received in the lens tube 20. The lens module 10 includes at least one lens 11. For reasons described below, lens tube screw threads 12 are formed on the outer wall of the lens module 10.

The lens tube 20 includes a first lens tube surface 21 and a second lens tube surface 22. The second lens tube surface 22 is spaced apart from the first lens tube surface 21. A lens receiving space 23 is defined between the first lens tube surface 21 and the second lens tube surface 22. The lens module 10 is received in the lens receiving space 23. Lens screw threads 231 are formed on the inner wall of the lens receiving space 23. The lens screw threads 231 are matched to the lens tube screw threads 12.

The lens tube 20 further includes an outer wall 24. The outer wall 24 of the lens tube 20 is located on an opposite side of the lens tube 20 from the lens screw threads 231 of the lens receiving space 23. The outer wall 24 of the lens tube 20 is perpendicular to the first lens tube surface 21 and parallel to the direction of the lens screw threads 231.

The lens tube 20 is fixed on the base 30.

The base 30 includes a first base surface 31 touching the second lens tube surface 22 and a second base surface 32 spaced apart from the first base surface 31. A sensor receiving groove 33 is formed between the second base surface 32 and the first base surface 31. The sensor 50 is received in the sensor receiving groove 33. A supporting portion 34 is formed at the meeting location of the lens receiving space 23 and the sensor receiving groove 33. A gap 35 is formed on the supporting portion 34. The lens receiving space 23 and the sensor receiving groove 33 are connected by the gap 35.

The optical filter 40 filters out stray light that may enter into the camera module 100. The optical filter 40 is fixed on the supporting portion 34 between the sensor 50 and the lens 11. Because the optical filter 40 is designed to be wider than the lens 11, parts of the optical filter 40 are exposed beyond the sides of the lens 11 and into the gap 35.

The sensor 50 is formed on the printed circuit board 60 and received in the sensor receiving groove 33. The sensor 50 is under and in-line with the optical filter 40. The sensor 50 is electrically connected to the printed circuit board 60.

The base 30 is fixed on the printed circuit board 60. Electronic components 61 are formed on and electrically connected to the printed circuit board 60. The electronic components 61 are dispersed around the sensor 50 and received in the sensor receiving groove 33.

The protecting cover 70 is set over the lens tube 20. The protecting cover 70 includes a cushioning portion 71 and a dustproofing portion 72. The cushioning portion 71 and the dustproofing portion 72 are attached to and cover the outer exposed surfaces of the lens tube 20. The cushioning portion 71 is attached to the outer wall 24 of the lens tube 20. The dustproofing portion 72 is attached to the first lens tube surface 21 of the lens tube 20. The dustproofing portion 72 covers the external threads 12 and the internal threads 231. The cushioning portion 71 is elastic.

In at least one embodiment, the cushioning portion 71 and the dustproofing portion 72 can be integrally formed together.

The dustproofing portion 72 includes a through-hole 721. A diameter of the through-hole 721 is smaller than the diameter of the lens receiving space 23. The lens module 10 protrudes from the through-hole 721 and cannot separate from the rest of the lens because of the smaller diameter of through-hole 721.

The cushioning portion 71 is made of elastic materials, such as rubber. The dustproofing portion 72 is made of rubber, foam, or other materials.

In at least one embodiment, the cushioning portion 71 and the dustproofing portion 72 are both made of a same material.

Figure 3:
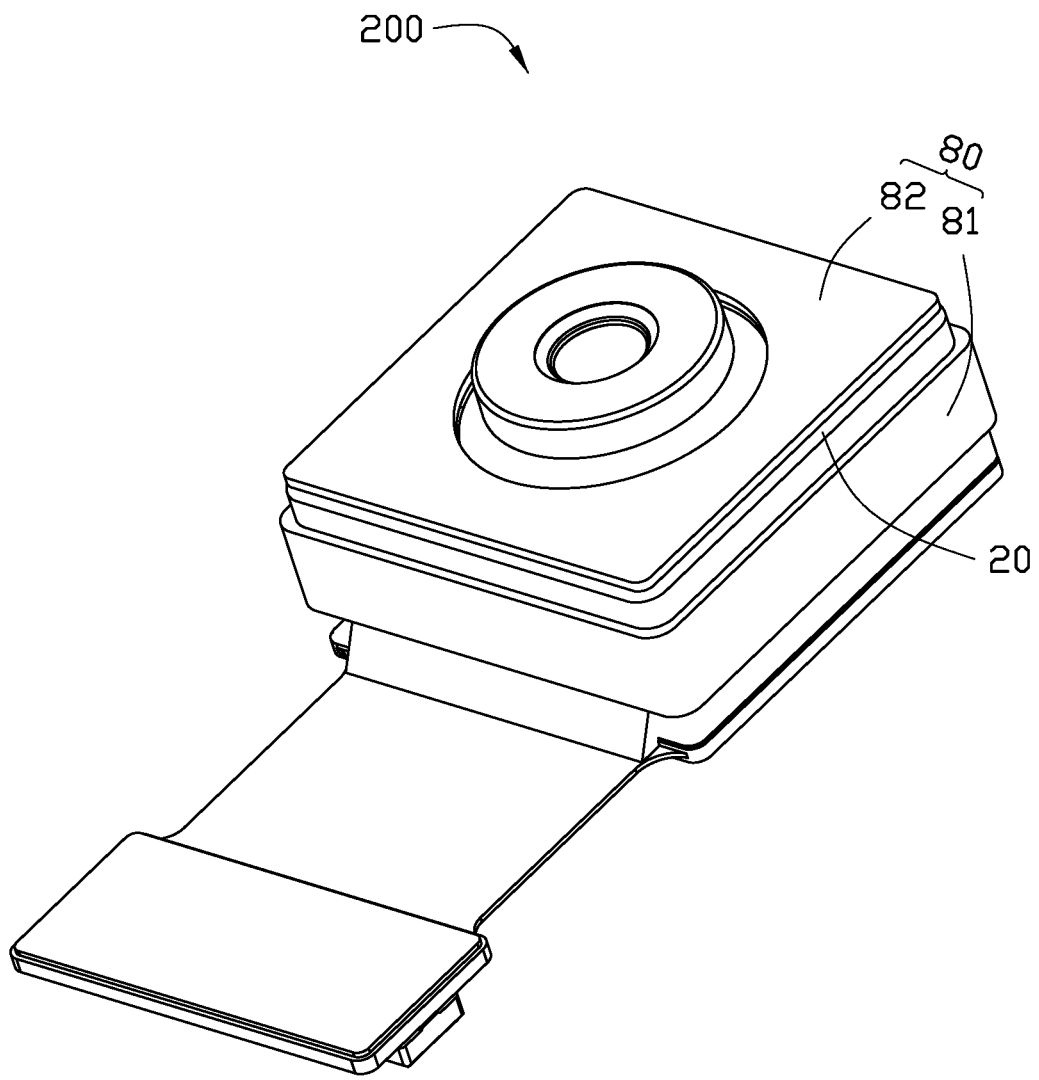
FIG. 3 is a perspective view of another embodiment of a camera module according to the present disclosure.

FIG. 3 illustrates another embodiment of a camera module 200. The camera module 200 has a similar structure to that of the camera module 100. The difference between the camera module 200 and the camera module 100 is in the protecting cover 80 of the camera module 200. The cushioning portion 81 and the dustproofing portion 82 are separate. The cushioning portion 81 and the dustproofing portion 82 are made of different materials. The cushioning portion 81 may be made of rubber and the dustproofing portion 82 can be made of foam.

With the embodiments described above, the cushioning portion 71/81 is attached on the outer wall 24 of the lens tube 20, the dustproofing portion 72/82 is attached on the first lens tube surface 21 of the lens tube 20, and the dustproofing portion 72 covers the external threads 12 and the internal threads 231. Thereby, (1) the camera module 100/200 is protected against short-circuiting, opening up, or separating from the electronic device, any of which may result from the dropping of the device. Thus, the service life of the camera module is increased. If the camera module 100/200 is subjected to an impact force, the glue between the lens holder and the mirror holder will resist such impact forces and prevent breakage and the form of fragments or particles that obstruct the lens. This results in increased imaging quality of the camera module.

The embodiments shown and described above are only examples. Many details are often found in the art such as the other features of a camera module. Therefore, many such details are neither shown nor described. Even though numerous characteristics and advantages of the present technology have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A camera module comprising:
a lens module, wherein the lens module comprises lens screw threads on its outer wall;
a lens tube, the lens tube comprises a lens receiving space, the lens module being received in the lens receiving space, lens tube screw threads being formed on an inner wall of the lens receiving space, the lens tube screw threads matching the lens screw threads;
a protecting cover, the protecting cover comprising a cushioning portion and a dustproofing portion, the cushioning portion and the dustproofing portion being attached to and cover the outer exposed surfaces of the lens tube, the dustproofing portion covering the lens thread and the lens tube screw threads;
the dustproofing portion comprises a through-hole, a diameter of the through-hole is smaller than the diameter of the lens receiving space, the lens protrudes from the through-hole.

2. The camera module of claim 1, wherein the cushioning portion is elastic.

3. The camera module of claim 2, wherein the cushioning portion is made of rubber.

4. The camera module of claim 1, wherein the dustproofing portion is made of rubber, or foam.

5. The camera module of claim 1, wherein the cushioning portion and the dustproofing portion are integrally formed together.

6. The camera module of claim 1, wherein the cushioning portion and the dustproofing portion are separately formed.

7. The camera module of claim 1, wherein the camera module further comprises a base, the lens tube is fixed on the base.

8. The camera module of claim 7, wherein the camera module further comprises an optical filter, the optical filter is fixed on the base, the lens module comprises at least one lens, the optical filter faces the lens.

9. The camera module of claim 8, wherein the optical filter is designed to be wider than the lens.

10. The camera module of claim 8, wherein the base comprises a sensor receiving groove, the lens receiving space and the sensor receiving groove are connected, a sensor is received in the sensor receiving groove.

11. The camera module of claim 10, wherein a supporting portion is formed at the meeting location of the lens receiving space and the sensor receiving groove, a gap is formed on the supporting portion, the lens receiving space and the sensor receiving groove are connected by the gap.

12. The camera module of claim 11, wherein the optical filter is fixed on the supporting portion between the sensor and the lens.

13. The camera module of claim 11, wherein parts of the optical filter are exposed beyond the sides of the lens and into the gap.

14. The camera module of claim 10, wherein the camera module further comprises a printed circuit board, the base is fixed on the printed circuit board, the sensor is formed on the printed circuit board, the sensor is electrically connected to the printed circuit board.

* * * * *